May 13, 1958  W. A. MAUDE  2,834,620
IMPROVED ROTATIVE DRIVE ASSEMBLY
Filed May 14, 1956

Inventor:
William A. Maude
by, Richard E. Horley
His Attorney

United States Patent Office 2,834,620
Patented May 13, 1958

2,834,620

IMPROVED ROTATIVE DRIVE ASSEMBLY

William A. Maude, Lynn, Mass., assignor to General Electric Company, a corporation of New York Application May 14, 1956, Serial No. 584,626

6 Claims. (Cl. 287—53)

My invention pertains to an improved rotative drive assembly and particularly to a manner of coupling driving and driven members thereof.

A rotative drive assembly having a driving member and a driven member mountable thereon for rotation therewith is often designed to permit rapid disassembly and changeability of the driven member. This is particularly true of, but not limited to, a rotative drive assembly including change gears having utility in gear trains or similar devices where the object might be to have changeable speed drives for a recording means such as a chart upon which a measurement is to be recorded. In such applications, while the drive assembly must be adapted for quick disassembly, it must also be relatively free from backlash. The structural requirements permitting rapid disassembly usually call for a relatively loose coupling between driving and driven members which thereby gives rise to opportunity for backlash to occur. A machining or fabrication of the members of the assembly of present known designs within tolerances which would tend to eliminate backlash would operate to reduce the ease and hence the rapidity with which disassembly and changeability of parts could take place.

It is an object of my invention to provide an improved rotative drive assembly having a driving member and a driven member mounted thereon for rotation therewith which are adapted to form a coupling which permits rapid assembly and disassembly but which eliminates backlash due to the relative movement of the parts.

It is a further object of my invention to provide an improved rotative drive assembly where backlash due to relative movement of the members can be eliminated while using parts which are fabricated in accordance with ordinary manufacturing techniques within ordinary tolerances.

In accordance with the above and other objects, my invention broadly provides a rotative drive assembly comprising a rotatable driving member and a driven member mountable thereon so as to have a common axis of rotation. The end portion of the driving member is adapted to support the driven member and is further designed to have at least one straight edge extending transversely to and either passing through or offset from the axis of rotation. The driven member is designed to have a coupling surface which is adapted to abut the straight edge to form a rotative drive engagement.

It is a particular feature of this invention that the coupling surface abut the straight edge of the driving member in a tangential manner so that the drive engagement be formed by a surface and edge abutment. It is this feature of the invention which permits coupling the driving and driven members in a manner whereby relative rotative movement between the members is prevented. The coupling surface is tangential to the edge of the driving member if a plane tangent to the surface along the line of abutment is inclined relative to the axis of rotation.

While a single surface to edge abutment between the driving and driven members is all that is necessary, it is a specific feature of this invention that the driving member have a pair of parallel straight edges transverse to and, in the preferred embodiment, on opposite sides of the axis of rotation and that the coupling surface of the driven member abut both straight edges in a tangential manner. While the coupling surface may be contoured in any manner to accomplish the abutment with the straight edges in a tangential manner, it is an additional feature of this invention that the surface be a segment of a circle when viewed in transverse cross section. Means is provided to engage with members to impose an axial constraint upon the members to maintain the surface and edge abutment. It is still another feature of this invention that the axial constraint upon the members be imposed by a bowed retaining ring member capable of being removably fixed in groove means provided on an extremity of the driving member so as to bear on the driven member to maintain the drive engagement.

Thus, it will be appreciated that an improved drive assembly has been provided which is capable of eliminating backlash due to relative movement of the members of the assembly by virtue of a coupling between the members comprising an abutting surface and edge. It can be further appreciated that fabrication of parts to accomplish this abutment can be achieved without necessity for fine tolerances.

The features of this invention which are believed to be novel are set forth with particularly in the appended claims. The invention itself may be better understood as to organization and construction as well as to further objects and advantages by reference to the following description taken in conjunction with the accompanying drawings in which:

Figure 1:
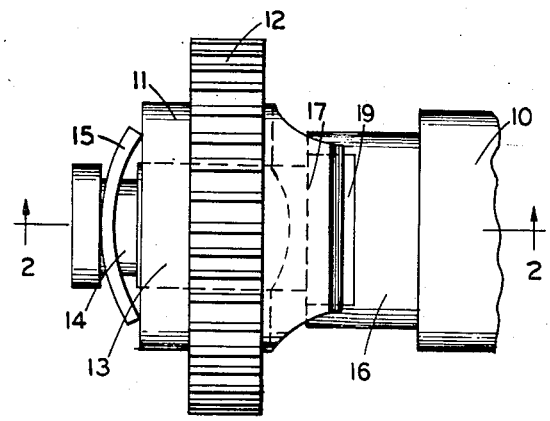
Figure 1 is a plan view of a drive assembly embodying the features of this invention.
Figure 4:
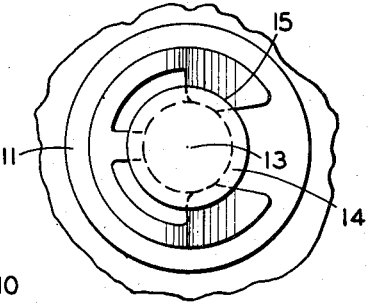
Figure 4 is an end view taken from the left of Figure 2.
Figure 2:
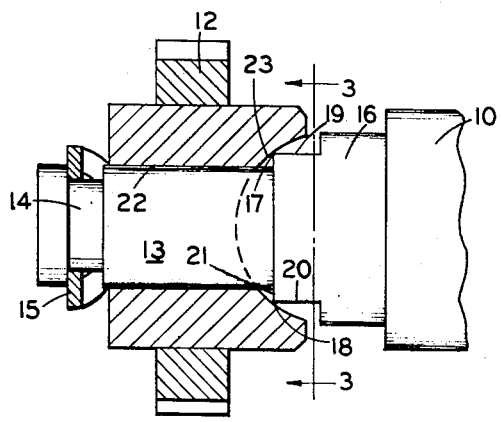
Figure 2 is a cross section taken along line 2—2 of Figure 1 to disclose the inner details of the coupling forming the drive engagement.
Figure 3:
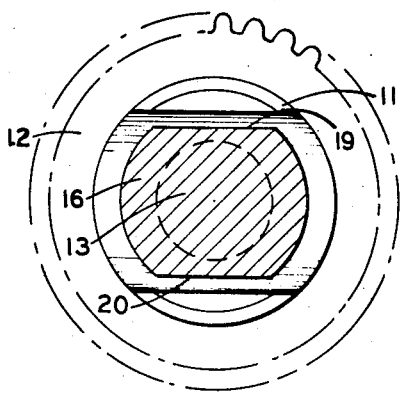
Figure 3 is an end view of the assembly of Figure 1 with a portion of the shaft shown in cross section taken along line 3—3 in Figure 2.

Referring to Figure 1, there is shown a rotative drive assembly incorporating the features of my invention, comprising a rotatable driving member taking the form of a rotatable shaft 10 having an end portion adapted to support a driven member in the form of a change gear assembly comprising a cylindrical hub member 11 to which is attached a ring gear 12. The end portion of shaft 10 is designed to have a cylindrical terminal portion 13 of reduced diameter having an annular groove 14 near its outermost extremity in its outer periphery adapted to receive a bowed retaining member 15 preferably an E-ring. The terminal portion 13 extends from an abutment 16 of somewhat larger diameter than the terminal portion 13. Although the figures disclose the abutment to be of lesser diameter than the main portion of shaft 10, these diameters may be equal so that the abutment is the extremity of the main body of the shaft at its end portion. A pair of parallel straight edges 17 and 18 (as best seen in Figure 2) are formed in the end of abutment 16 of the end portion of shaft 10. These straight edges are defined by planar surfaces 19 and 20 which are preferably mutually perpendicular to planar surface 21 so as to make the edges square. Surface 21, which also defines the end of abutment 16 and one end of terminal portion 13, is formed upon the turning of shaft 10 to machine the terminal portion 13, whereas surfaces 19 and 20 are formed by milling the peripheral surface of the abutment on opposite ends of a diameter along surfaces parallel to each other and transverse to the axis of rotation.

The mounting of the change gear assembly upon shaft 10 is accomplished by providing a central opening 22 through the hub member 11 to receive the terminal portion 13 of shaft 10. The coupling of the driving and driven members to impart rotation is effectuated by a drive engagement produced by abutting contact of the edges 17 and 18 of the abutment 16 of shaft 10 and a coupling surface 23 in the end of hub 11, which surface preferably defines a diametrical groove in the end of the hub 11 so formed as to be transverse to and connected with the opening 22. In its preferred form the diametrical groove is cut into the end of hub 11 so as to be a segment of a circle when taken in cross section; however, this groove may take any form or shape which receives the end of abutment 16 and forms a driving connection in a manner whereby the coupling surface is in contact in tangential manner with the straight edges 17 and 18 of the shaft 10.

In the fabrication of a drive assembly in accordance with my invention, the change gear assembly is made separately following machining of hub member 11 to have the central opening or bore 22 and the diametrical groove, defined by coupling surface 23, in one end thereof so as to connect with this central opening. Ring gear 12 of suitable inside diameter is mounted concentrically upon hub member 11, so as to be firmly secured against relative motion between ring gear and hub member, in any well known manner such as by force fitting the parts. It is of course understood that ring gear 12 and hub member 11 may be formed as integral from a single part such as by machining a projection upon the face of the gear 12. The shaft 10 is suitably turned to provide abutment 16, terminal portion 13 and groove 14. Transverse edges 17 and 18 are preferably formed by simultaneously milling surfaces 19 and 20 into abutment 16. The diameter of terminal portion 13 is such that a fit is provided with hub member 11 when change gear assembly is mounted thereon which is sufficiently snug to prevent the axes of rotation from becoming disaligned. Assembly of the change gear assembly on the terminal portion 13 of shaft 10 is made to the extent that abutment 16 enters transverse groove in hub member 11 to point of contact thus bringing at least one of the transverse edges 17 and 18 into contact with coupling surface 23. It is a particular advantage of my invention, that should manufacturing tolerances be such as to produce a positioning of the transverse groove so that abutment can be made with only one transverse edge, the driving connection is still good enough to prevent backlash in the coupling. It is of course understood that greater mechanical and wear advantages are secured by the symmetrical arrangements disclosed and that manufacturing tolerances can be increased without sacrificing ease of assembly to assure to a greater degree that both edges 17 and 18 contact coupling surface 23 upon assembly of the members. The assembly is then secured against relative axial movement by retaining member 15 which is placed in groove 14. Through the bow in the retaining member 15 a constant force is applied to the hub member and the shaft to maintain the driving connection of the coupling thus eliminating relative axial or rotative movements between the members.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. A rotative drive assembly comprising a rotatable driving member having an end portion adapted to have at least one straight edge transverse to an axis of rotation, a driven member mounted on said end portion for rotation therewith, said driven member having a curved coupling surface abutting said edge in a tangential manner to form a rotative drive engagement, and retaining means engaging and axially constraining said members to maintain said drive engagement whereby relative movement between said members is prevented.

2. In a rotative drive assembly, the combination comprising a rotatable driving member having an end portion adapted to have a plurality of planar surfaces forming a pair of parallel edges transverse to an axis of rotation, a driven member mounted on said portion of said driving member for rotation therewith, said driven member having a coupling surface defining a groove transverse to the axis of rotation and adapted to receive said end portion of said shaft, and retaining means engaging said members opposing relative axial movement thereof and constraining said members to maintain tangential abutment within said groove between said surface of said driven member and said edges to prevent relative movement between said members.

3. A rotative drive assembly comprising a rotatable driving member having an end portion adapted to have a plurality of mutually perpendicular planar surfaces forming a pair of parallel edges transverse to an axis of rotation, a driven member adapted to be mounted on said end portion of said driving member for rotation therewith, said driven member having a coupling surface defining a groove transverse to the axis of rotation and adapted to receive said end portion of said shaft, and retaining means engaging said members opposing relative axial movement thereof and constraining said members to effectuate and maintain an abutment of said surface in a tangential manner with said edges to prevent relative movement therebetween.

4. A rotative drive assembly comprising a rotatable shaft having an end portion adapted to have an abutment with a pair of parallel edges transverse to and on opposite sides of the axis of rotation and a terminal portion having peripheral groove means therein, a detachable hub member mounted on said terminal portion having an axial opening therethrough and a diametrical groove in one end thereof transverse to and connecting with said opening, said hub member and said shaft forming a rotative drive engagement within said diametrical groove whereby said edges of said abutment and the surface of said groove abut in a tangential manner, and a retaining ring member slidable within said peripheral groove means adapted to impose a constraint upon the other end of said hub to maintain said drive engagement whereby relative movement of said hub and said shaft is prevented.

5. A rotative drive assembly comprising a rotatable shaft having an end portion adapted to have an abutment with a pair of parallel edges transverse to and on opposite sides of the axis of rotation and a cylindrical terminal portion having an annular groove in the outer periphery thereof, a detachable hub member mounted on said terminal portion having an axial opening therethrough and a diametrical groove in one end thereof transverse to and connecting with said opening, said hub member and said shaft forming a rotative drive engagement within said diametrical groove whereby said edges of said abutment and the surface of said groove abut in a tangential manner, and a retaining ring member slidable within said annular groove bowed to impose a constraint upon the other end of said hub to maintain said drive engagement whereby relative movement of said hub and said shaft is prevented.

6. A rotative drive assembly comprising a rotatable shaft having an end portion adapted to have an abutment with a pair of parallel edges transverse to and on opposite sides of the axis of rotation and a cylindrical terminal portion having an annular groove in the outer periphery thereof, a detachable hub member mounted on said terminal portion having an axial opening therethrough and a diametrical groove in one end thereof transverse to and connecting with said opening, said diametrical groove having the contour of a segment of a circle in transverse cross section, said hub and said shaft forming a rotative drive engagement within said diametrical groove whereby said edges of said abutment and the surface of said diametrical groove abut in a tangential manner, and a bowed E-ring slidable into said annular groove of said terminal portion to impose a constraint upon the other end of said hub to maintain said drive engagement whereby relative movement of said hub and said shaft is prevented.

References Cited in the file of this patent
UNITED STATES PATENTS 1,056,857    Thomas _____ Mar. 25, 1913